(12) United States Patent
Aoyama et al.

(10) Patent No.: US 7,327,397 B2
(45) Date of Patent: Feb. 5, 2008

(54) IMAGE PROCESSING WITH PIXEL INTERPOLATION

(75) Inventors: Koji Aoyama, Saitama (JP); Makoto Kondo, Kanagawa (JP); Kazuhiko Nishibori, Kanagawa (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 10/498,204

(22) PCT Filed: Dec. 13, 2002

(86) PCT No.: PCT/JP02/13100

§ 371 (c)(1),
(2), (4) Date: Jun. 9, 2004

(87) PCT Pub. No.: WO03/055212

PCT Pub. Date: Jul. 3, 2003

(65) Prior Publication Data
US 2005/0012856 A1 Jan. 20, 2005

(30) Foreign Application Priority Data
Dec. 13, 2001 (JP) .............................. 2001-380760

(51) Int. Cl.
H04N 5/14 (2006.01)
H04N 7/01 (2006.01)
H04N 9/64 (2006.01)
H04N 11/20 (2006.01)
G06K 9/32 (2006.01)
G06K 9/40 (2006.01)

(52) U.S. Cl. ...................... 348/441; 348/443; 348/447; 348/459; 348/699; 348/700; 348/715

(58) Field of Classification Search ................ 348/441, 348/443, 447, 452, 459, 699, 700–701, 715; 382/260–262, 300
See application file for complete search history.

(56) References Cited

U.S. PATENT DOCUMENTS
6,542,197 B1 * 4/2003 Ko .............................. 348/452

(Continued)

FOREIGN PATENT DOCUMENTS
EP 0 514 012 11/1992

(Continued)

Primary Examiner—Brian P. Yenke
(74) Attorney, Agent, or Firm—Frommer Lawrence & Haug LLP; William S. Frommer

(57) ABSTRACT

The present invention provides an image signal processing apparatus and a method thereof which shifts positions of each detected pixel in image signals generated by performing double-speed conversion, wherein a difference value in pixel signal level between a detected pixel in a current field and a detected pixel at the same position in a field which comes one frame behind the current field is calculated, to specify a first field, a motion vector for a field which comes one frame or two frames behind the current field is detected with respect to the detected pixel in the current field, interpolation pixel data for the detected pixel is calculated based on the detected pixel in the current field and the each pixel in the field which comes one frame or two frames behind the current field, the interpolation pixel data is disposed in the pixel position obtained by shifting the position of the detected pixel in the current field in a direction along the motion vector, in a field subsequent to the first field, and the shift amount is sequentially increased every time the field shifts from the first field to the following fields within a range of a vector quantity of the detected motion vector.

22 Claims, 13 Drawing Sheets

U.S. PATENT DOCUMENTS

| | | | |
|---|---|---|---|
| 6,947,094 B2 * | 9/2005 | Hoshino et al. | 348/441 |
| 7,092,032 B1 * | 8/2006 | Matsunaga et al. | 348/452 |
| 7,116,372 B2 * | 10/2006 | Kondo et al. | 348/448 |
| 7,133,453 B2 * | 11/2006 | Arita et al. | 375/240.16 |
| 7,215,377 B2 * | 5/2007 | Hoshino et al. | 348/452 |
| 7,221,403 B2 * | 5/2007 | Aoyama et al. | 348/452 |
| 2003/0107672 A1 * | 6/2003 | Hoshino et al. | 348/459 |
| 2004/0199887 A1 * | 10/2004 | Jain et al. | 716/5 |
| 2005/0012856 A1 * | 1/2005 | Aoyama et al. | 348/459 |
| 2005/0012857 A1 * | 1/2005 | Aoyama et al. | 348/459 |

FOREIGN PATENT DOCUMENTS

| | | |
|---|---|---|
| JP | 61-26382 | 2/1986 |
| JP | 3-165190 | 7/1991 |
| JP | 4-227180 | 8/1992 |
| JP | 5-137122 | 6/1993 |
| JP | 6-500910 | 1/1994 |
| JP | 8-84293 | 3/1996 |
| JP | 10-501953 | 2/1998 |
| JP | 11-196383 | 7/1999 |
| JP | 11-298861 | 10/1999 |
| JP | 2001-169252 | 6/2001 |

* cited by examiner

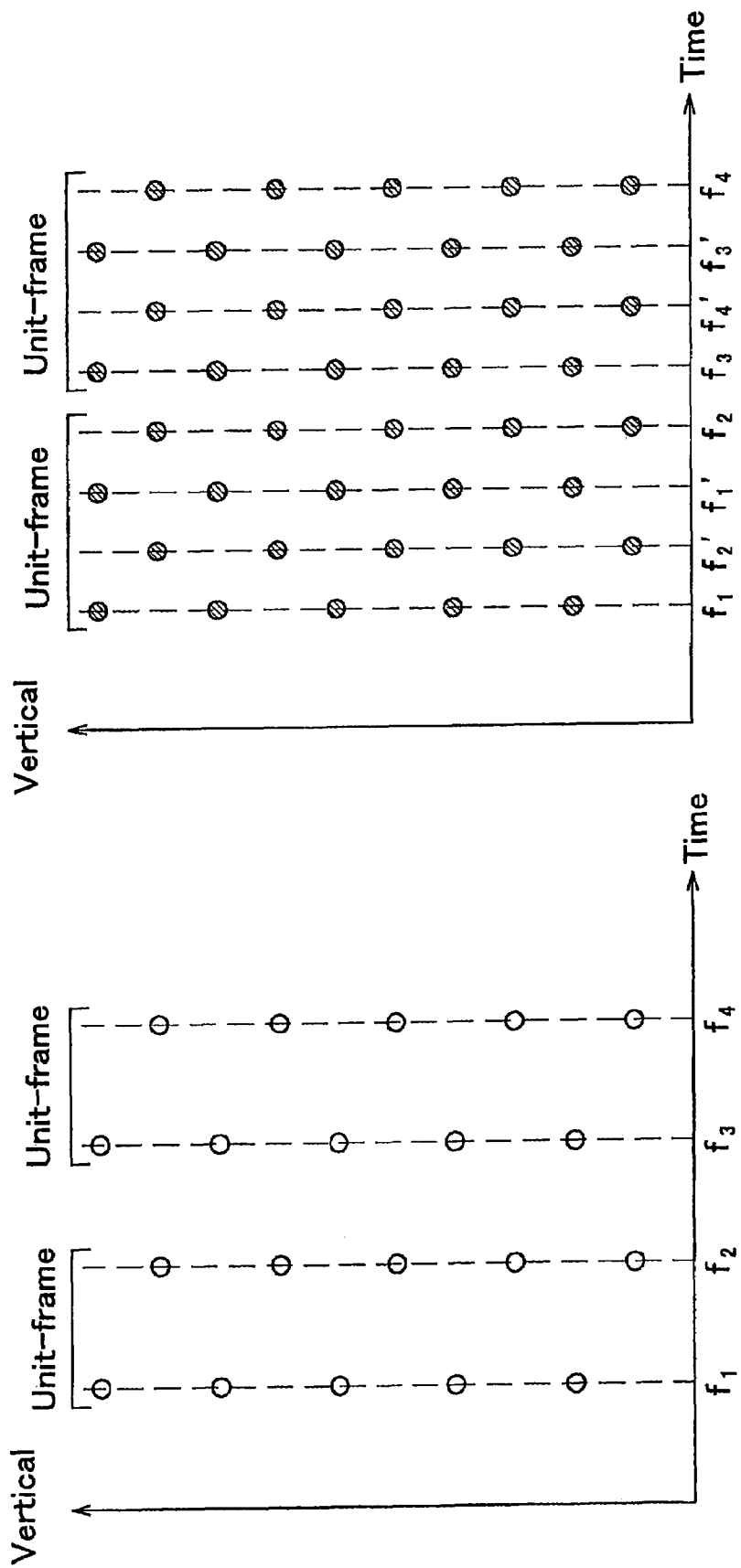

FIG.12A Input signal

| Number | 0 | 1 | 2 | 3 | 4 | 5 | 6 | 7 | 8 | 9 | 10 | 11 |
|---|---|---|---|---|---|---|---|---|---|---|---|---|
| Image data D1 | 100 | 100 | 200 | 200 | 150 | 150 | 110 | 110 | 100 | 100 | 100 | 100 |
| Image data D2 | 100 | 100 | 100 | 100 | 200 | 200 | 200 | 150 | 150 | 110 | 100 | 100 |
| Motion vector | 0 | 0 | 2 | 2 | 3 | 3 | 3 | 3 | 3 | 0 | 0 | 0 |

FIG.12B Data processing

| Buffer control signal S11 | 0 | 1 | 2 | 3 | 4 | 5 | 6 | 7 | 8 | 9 | 10 | 11 |
|---|---|---|---|---|---|---|---|---|---|---|---|---|
| Shift data SD1 | 100 | 100 | 200 | 200 | 150 | 150 | 110 | 110 | 100 | 100 | 100 | 100 |
| Buffer control signal S12 | 0 | 1 | 4 | 5 | 7 | 8 | 9 | 10 | 11 | | | |
| Shift data SD2 | 100 | 100 | 200 | 200 | 150 | 150 | 110 | 100 | 100 | 100 | 100 | 100 |
| Number | 0 | 1 | 2 | 3 | 4 | 5 | 6 | 7 | 8 | 9 | 10 | 11 |
| Move data M1 | 100 | 100 | 200 | 200 | 150 | 150 | 110 | 105 | 100 | 100 | 100 | 100 |
| Flag F1 | 0 | 0 | 0 | 0 | 0 | 0 | 0 | 5 | 0 | 0 | 0 | 0 |

FIG.12C Vector processing

| Shift buffer readout control signal RS1 | 0 | 1 | 2 | 3 | 4 | 5 | 6 | 7 | 8 | 9 | 10 | 11 |
|---|---|---|---|---|---|---|---|---|---|---|---|---|
| Flag F' | NM | NM | NM | NM | NM | NM | NM | NM | NM | NM | NM | NM |
| Shift buffer readout control signal RS2 | 0 | 1 | 3 | 3 | 4 | 5 | 6 | 7 | 8 | 9 | 10 | 11 |
| Data | 100 | 100 | 200 | 200 | 150 | 150 | 110 | 105 | 100 | x | x | 100 |
| Move data M2 | 100 | 100 | | 200 | 200 | 150 | 150 | 105 | 105 | 100 | 100 | 100 |
| Shift Flag F2 | OK | OK | NM | OK | OK | OK | OK | OK | OK | OK | OK | OK |

FIG.12D Post processing

| Number | 0 | 1 | 2 | 3 | 4 | 5 | 6 | 7 | 8 | 9 | 10 | 11 |
|---|---|---|---|---|---|---|---|---|---|---|---|---|
| Correction Data H1 | 100 | 100 | 100 | 200 | 200 | 150 | 150 | 105 | 105 | 100 | 100 | 100 |

IMAGE PROCESSING WITH PIXEL INTERPOLATION

TECHNICAL FIELD

The present invention relates to an image signal processing apparatus which shifts the position of each detected pixel of image signals generated by performing double-speed conversion, and a processing method thereof.

This application is based upon and claims the benefit of priority from the prior Japanese Patent Application No. 2001-380760 filed Dec. 13, 2001, the entire contents of which are incorporated herein by reference.

BACKGROUND ART

As a conventional scanning system used for TV broadcasting, an interlace scanning system which scans every other horizontal scanning lines has been widely used. In this interlace scanning system, every frame image is formed of a field image consisting of odd-numbered scanning lines and a field image consisting of even-numbered scanning lines, to suppress screen flicker disturbance which causes the entire screen to flicker, thus preventing deterioration of the screen quality.

The interlace scanning system has been adopted as a standard system for television in countries throughout the world. For example, according to PAL (Phase Alternation by Line) system in European television broadcasting, the field frequency is 50 Hz (frame images: 25 frame/second, field images: 50 fields/second).

In particular, the PAL system conventionally adopts a double-speed field frequency system in which the field frequency of inputted image signals is converted to be doubled from 50 Hz to 100 Hz, by performing an interpolation processing or the like, expecting further suppression of the screen flicker disturbance.

FIG. 1 is a block diagram showing a double-speed field conversion circuit 5 using the double-speed field frequency system. The double-speed field conversion circuit 5 is integrated in a television receiver 6 which has an input terminal 61, a horizontal/vertical deflection circuit 62, and a CRT 63. This double-speed field conversion circuit 5 has a double-speed converter 51, and a frame memory 52.

The double-speed converter 51 writes image signals of 50 fields/second according to the PAL system inputted from the input terminal 61 into the frame memory 52. Also, the double-speed converter 51 reads the image signals written in the frame memory 52, at a speed twice higher than the writing speed. Thus, the frequency of the image signals of 50 fields/second is converted to a double frequency, so that image signals of 100 fields/second can be generated.

The double-speed converter 51 outputs the image signals subjected to the double conversion to the CRT 63. The CRT 63 displays the inputted image signals on the screen. Horizontal and vertical deflection of the image signals in the CRT 63 is controlled based on a horizontal/vertical rectangular wave which is generated by the horizontal/vertical deflection circuit 62 and has a frequency which is twice that of the inputted image signals.

FIGS. 2A and 2B show a relationship between each field and pixel positions with respect to image signals before and after the double-speed conversion. In each figure, the abscissa axis represents time, and the ordinate axis represents the position of each pixel in the vertical direction. The image signals indicated by white circle marks in FIG. 2A are interlace image signals of 50 fields/second before the double-speed conversion, and the image signals indicated by black circle marks in FIG. 2B are interlace image signals of 100 fields/second after the double-speed conversion.

In the image signals shown in FIG. 2A, fields f1 and f2 are signals generated from one single unit-frame of a film. Likewise, fields f3 and f4 constitute one single unit-frame. Since these image signals are interlace image signals, the pixel positions in the vertical direction differ between adjacent fields. Therefore, it is impossible to create a new field between every two adjacent fields with the characteristics of interlacing maintained.

Hence, as shown in FIG. 2B, two fields f2' and f1' are newly generated between the fields f1 and f2. No new fields are generated between the fields f2 and f3 but two new fields f4' and f3' are generated between the fields f3 and f4. That is, one unit-frame is formed of four fields forming two frames.

In some cases, those newly generated fields f1', f2', ... are obtained by using a median filter or the like, supposing that each pixel value is an intermediate value among three pixels surrounding each pixel. The newly generated fields f1', f2', ... have the same contents as the fields f1, f2, ..., respectively.

Specifically, the double-speed field conversion circuit 5 provides parts in each of which two new fields are generated and parts in each of which no new fields are generated, alternately among fields of image signals before the double-speed conversion. The number of screen images per unit time can thus be increased, so that the screen flicker disturbance as previously described can be suppressed.

In order to watch a cinema film consisting of still images of 24 unit-frames/second on an ordinary TV set, television-to-cinema conversion (which will be hereinafter referred to as telecine conversion) is carried out to attain interlace television signals. FIGS. 3A and 3B show a relationship between each field and an image position in case where an image moves in the horizontal direction, with respect to the image signals after the telecine conversion. The abscissa axis represents the position of the image in the horizontal direction, and the ordinate axis represents time. In the image signals before the double-speed conversion shown in FIG. 3A, the fields f1 and f2 form one single unit-frame, so that the image is displayed at the same position. This image moves in the horizontal direction (to the right side) as the field shifts to the field f3. Since the field f4 forms part of the same unit-frame as the field f3, the image is displayed at the same position as in the field f3.

If image signals shown in FIG. 3A after the telecine conversion are subjected to the double-speed conversion according to the double-speed field frequency system, as shown in FIG. 3B, an equal image is displayed at an equal position in the fields f1, f2', f1', and f2 forming one single unit-frame. Similarly, an equal image is displayed at an equal position in the fields f3, f4', f3' and f4 forming one single unit-frame.

FIG. 4A shows a relationship between each field and an image position in case where an image moves in the horizontal direction, with respect to television signals (hereinafter referred to as TV signals) before the double-speed conversion. In FIG. 4A, each field f1, f2, f3 ... forms one independent unit-frame, so that images are displayed at different positions. The image moves, as a whole, in the horizontal direction (to the right side) every time the field shifts from the field f1 to f2, f3.

When image signals of the TV signals shown in FIG. 4A are subjected to the double-speed conversion according to the double-speed field frequency system, as shown in FIG.

4B, an equal image is displayed at an equal position in the fields f1, f2' forming one single unit-frame. Similarly, an equal image is displayed at an equal position in the fields f1' and f2 forming one single unit-frame.

In the image signals subjected to the double-speed conversion after the telecine conversion, the image is displayed at one equal position from the field f1 to the field f2 as shown in FIG. 3B. On the other hand, the image greatly moves in the horizontal direction when the field shifts from f2 to f3. Similarly, in the image signals obtained by double-speed converting the TV signals, the image is displayed at one equal position from the field f1 to the field f2' as shown in FIG. 4B. On the other hand, the image greatly moves in the horizontal direction when the field shifts from f2' to f1'.

In particular, output image signals form fields regularly at a cycle of one field per $\frac{1}{100}$ second. Therefore, a time band in which an image moves is shorter than another time band in which an image stands still. When a program is actually watched by a CRT, motions of images look discontinuous.

Further, in images of wide variations such as a case where each pixel value changes as the image moves in the horizontal direction, it is necessary to efficiently eliminate the discontinuity in image motion.

DISCLOSURE OF THE INVENTION

An object of the present invention is to provide a novel image signal processing apparatus and a method thereof capable of solving problems involved by a conventional image signal processing apparatus as described above and a method thereof.

Another object of the present invention is to provide an image signal processing apparatus and a method thereof capable of synergistically increasing image quality by smoothening motions while suppressing screen flicker disturbance, with respect to image signals generated by performing double-speed conversion, even in images of wide variations.

According to an image signal processing apparatus and a method thereof of the present invention, signals consist of unit-frames each formed of fields with a first field in the lead and which have been subjected to double-speed conversion are inputted, the first field is specified on the basis of calculated difference values in pixel signal levels, interpolation pixel data is calculated for each detected pixel, and the interpolation pixel data is written into the pixel positions obtained by shifting the positions of the detected pixels in a direction along the motion vector such that shift amount is gradually increased as the field shifts from the specified first field to the following fields.

More specifically, an image signal processing apparatus according to the present invention inputted with image signal consist of unit-frames each formed of fields with a first field in the lead and which has been subjected to double-speed conversion, comprises: a sequence detection means which calculates, a difference value in pixel signal level between a detected pixel in a current field and a detected pixel at the same position in a field which comes one frame behind the current field, with respect to the inputted image signal, and specifies the first field based on the difference value; a motion vector detection means which detects a motion vector for a field which comes one frame or two frames behind the current field, with respect to the detected pixel in the current field; a data calculation means which calculates interpolation pixel data for the detected pixel based on the pixel data of the detected pixel in the current field and the pixel data of each pixel in the field which comes one frame or two frames behind the current field; and an image control means which writes the interpolation pixel data into the pixel position obtained by shifting the position of the detected pixel in the current field in a direction along the motion vector, in a field subsequent to the first field, the image control means sequentially increases the amount with which the position of the detected pixel is shifted every time the field shifts from the first field to the following fields within a range of a vector quantity of the detected motion vector.

More specifically, an image signal processing method according to the present invention further comprises the steps of: inputting an image signal consist of unit-frames each formed of fields with a first field in the lead and which has been subjected to double-speed conversion; calculating, with respect to the inputted image signal, a difference value in pixel signal level between a detected pixel in a current field and a detected pixel at the same position in a field which comes one frame behind the current field to specify a first field based on the difference value; detecting a motion vector for a field which comes one frame or two frames behind the current field, with respect to the detected pixel in the current field; calculating interpolation pixel data for the detected pixel based on the pixel data of the detected pixel in the current field and the pixel data of each pixel in the field which comes one frame or two frames behind the current field; and writing the interpolation pixel data into the pixel position obtained by shifting the position of the detected pixel in the current field in a direction along the motion vector, in a field subsequent to the first field. The image control means sequentially increases the amount with which the position of the detected pixel is shifted every time the field shifts from the first field to the following fields within a range of a vector quantity of the detected motion vector.

BRIEF DESCRIPTION OF THE DRAWINGS

The above and other objects, advantages and features of the present invention will be more apparent from the following description taken in conjunction with the accompanying drawings.

FIGS. 2A and 2B show a relationship between each of fields before and after the double-speed conversion and pixel positions;

FIGS. 12A to 12D show a concrete operation example of the image shifter using pixel values.

BEST MODE FOR CARRYING OUT THE INVENTION

An image signal processing apparatus and a method thereof to which the present invention is applied will now be described in details with reference to the accompanying drawings.

Figure 1:
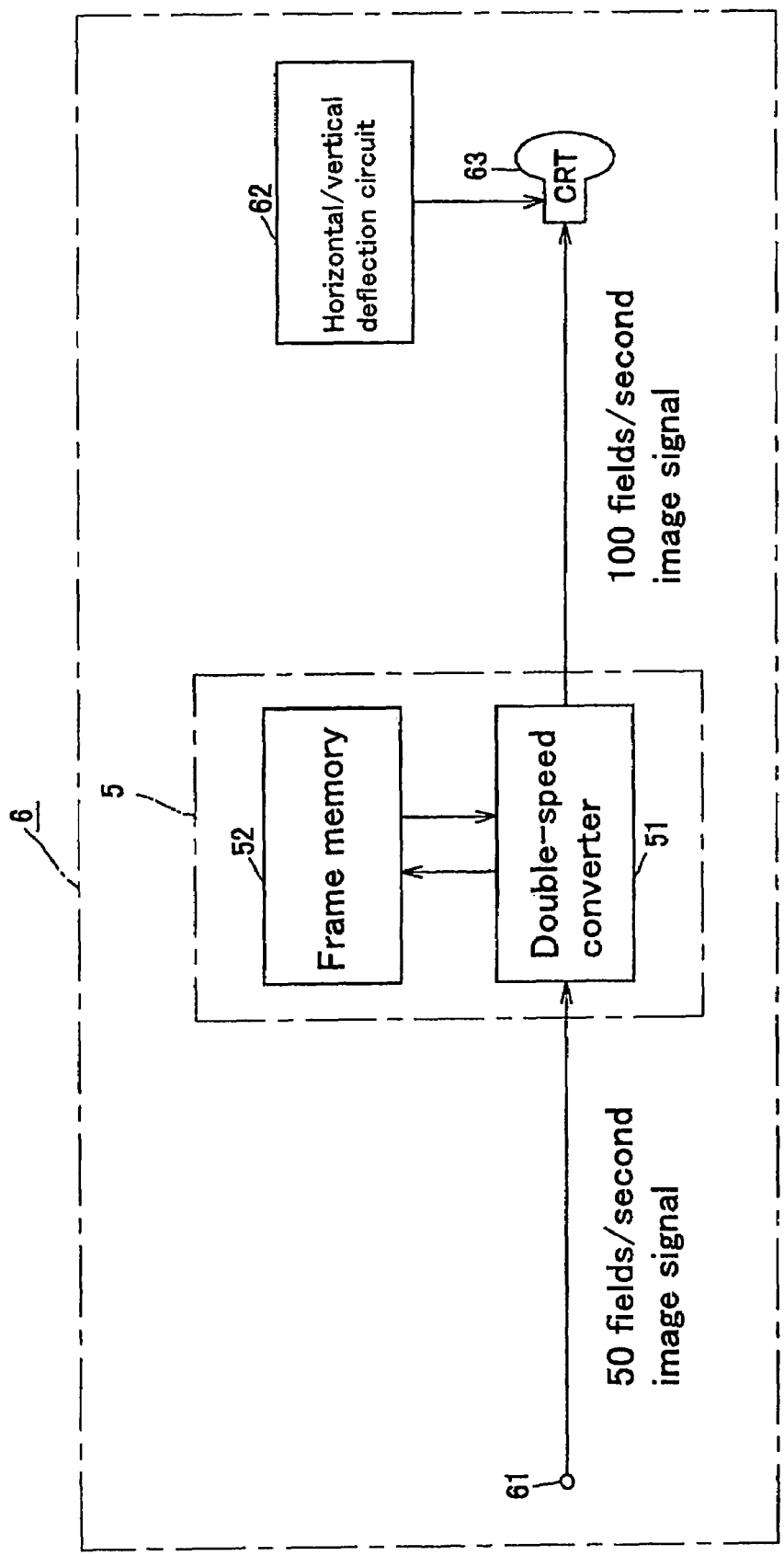
FIG. 1 is a block diagram showing a double-speed field conversion circuit to which a double-speed field frequency system is applied.
Figure 3B:
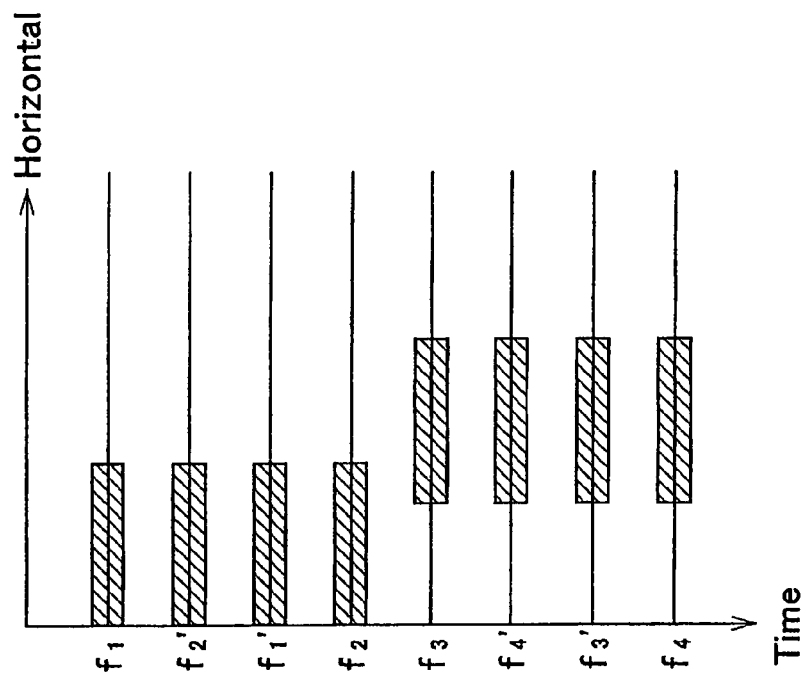
FIGS. 3A and 3B show a relationship between each field and an image position in the case where an image moves in the horizontal direction.
Figure 3A:
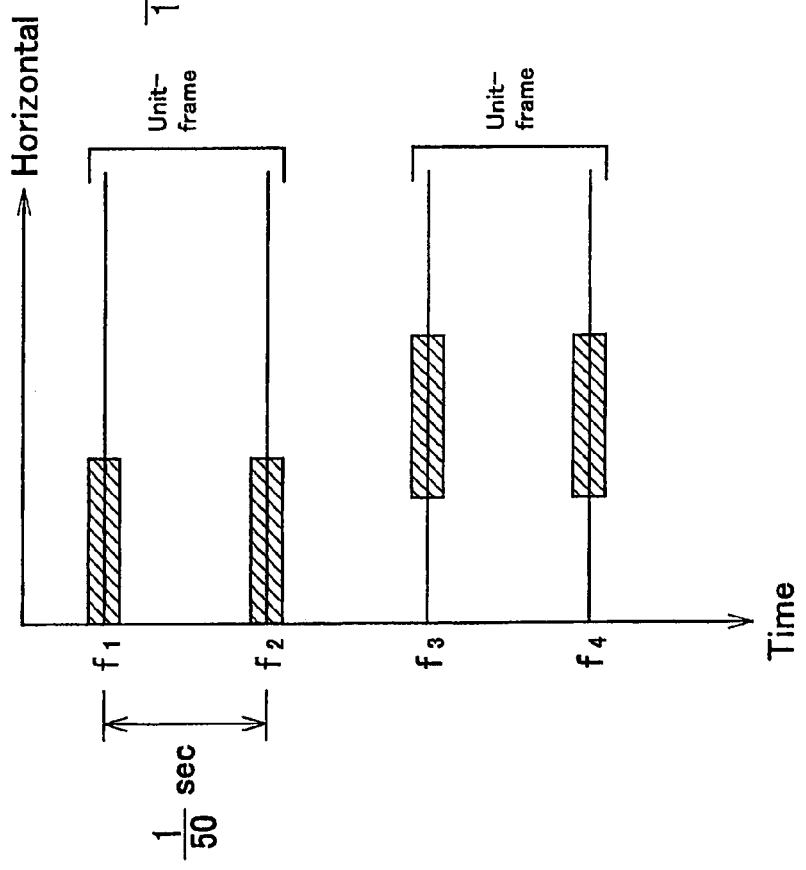
Figure 4B:
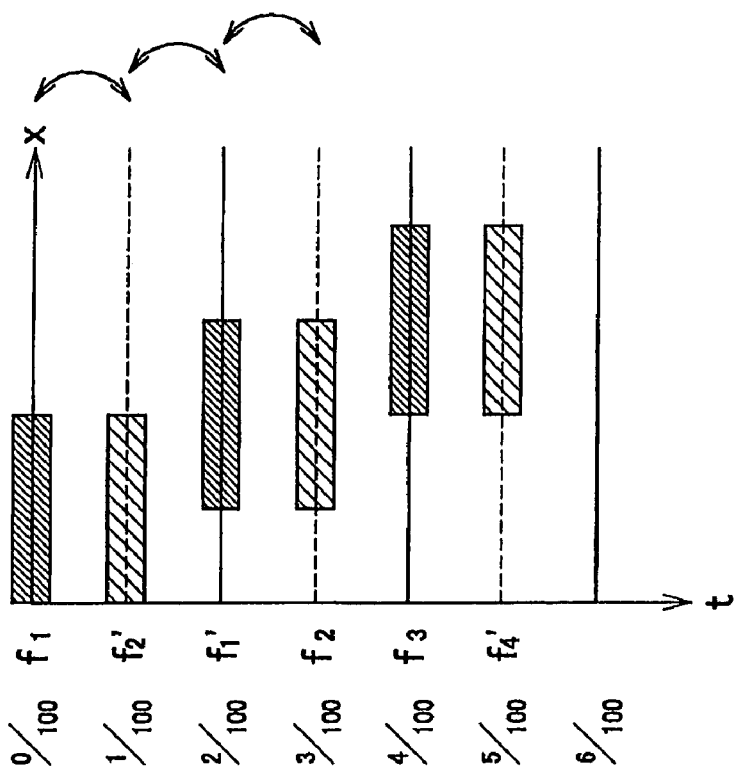
FIGS. 4A and 4B show a relationship between each field and an image position when an image moves in the horizontal direction in case where TV signals are inputted.
Figure 4A:
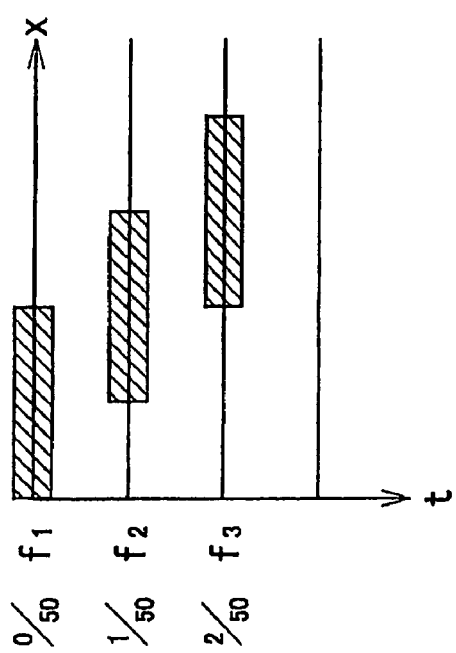
Figure 5:
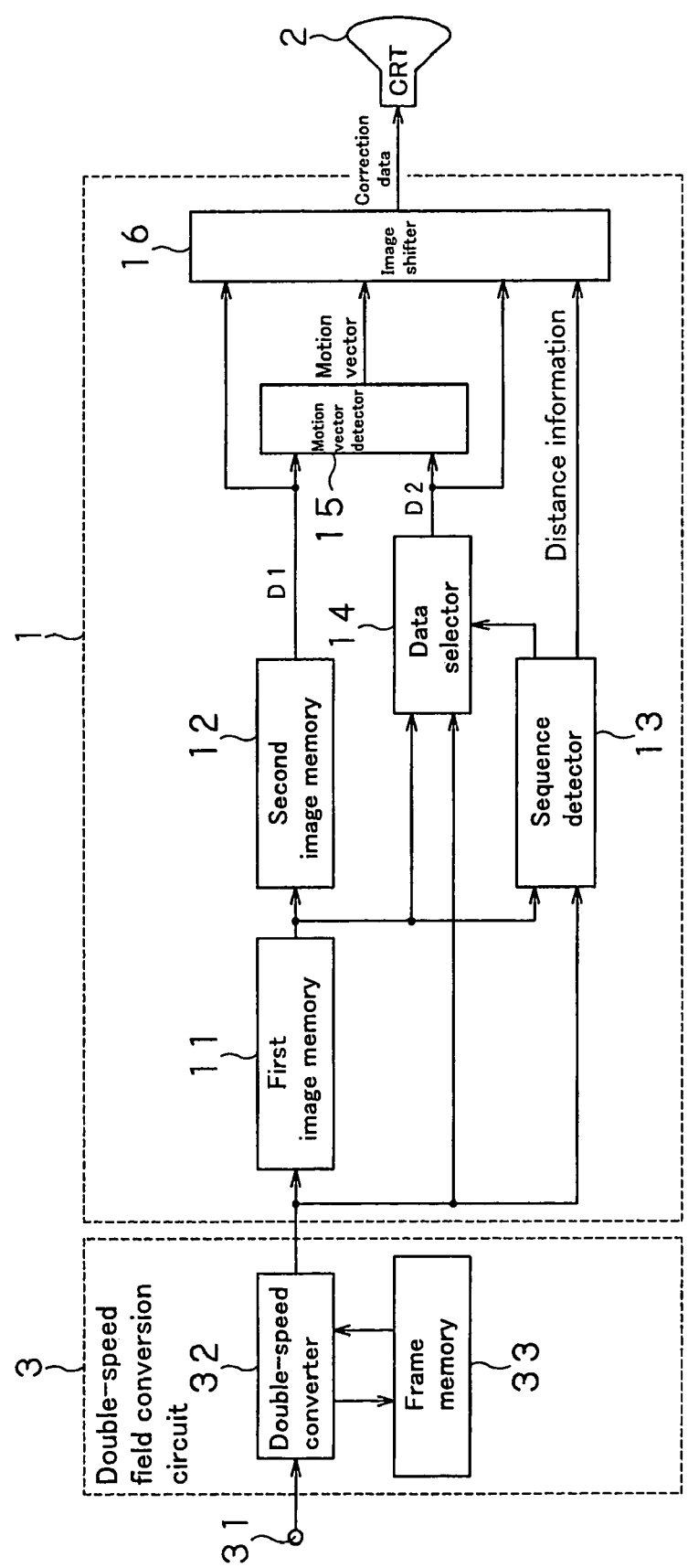
FIG. 5 is a block circuit diagram showing an image signal processing apparatus to which the present invention is applied.

FIG. 5 shows a first embodiment of an image signal processing apparatus 1 to which the present invention is applied. The image signal processing apparatus 1 shown in FIG. 5 is built in a television receiver according to e.g., PAL system (Phase Alternation by Line). Image signals after telecine conversion or television signals (hereinafter referred to as TV signals) are inputted to the image signal processing apparatus 1. The image signal processing apparatus 1 comprises, as shown in FIG. 5, a first image memory 11, a second image memory 12, a sequence detector 13, a data selector 14, a motion vector detector 15, and an image shifter 16.

The first image memory 11 is sequentially supplied with interlace image data of, for example, 100 fields/second which are generated by performing double-speed conversion on images subjected to telecine conversion and have a unit-frame formed of 4 fields. The first image memory 11 is also sequentially supplied with interlace image signals of, for example, 100 fields/second which are generated by performing double-speed conversion on TV signals and have a unit-frame formed of 2 fields.

The first image memory 11 stores the supplied image data for every one frame, in units of fields. That is, the image data is outputted from the first image memory 11 one frame after the image signals were supplied to the first image memory 11.

The second image memory 12 has the same internal structure as the first image memory 11 and stores the image data supplied from the first image memory 11 for every one frame, in units of fields. That is, the image data is outputted from the second image memory 12 one frame after the image data was supplied to the second image memory 12, i.e., two frames after the image data was supplied to the first image memory 11. This image data D1 stored in the second image memory 12 is supplied to the motion vector detector 15 and image shifter 16.

The sequence detector 13 detects the image data supplied to the first image memory 11 and the image data outputted from the first image memory 11, and compares image signal levels for every pixel, to calculate a difference value between the supplied and outputted signals. That is, the sequence detector 13 compares the image signal levels for each pixel at one single part of a screen, at cycles of frames. The sequence detector 13 transmits the calculation result concerning the difference value of the image signal levels to the image shifter 16. In addition to the above identification of each field, the sequence detector 13 determines either signals after the telecine conversion or TV signals, and transmits, as distance information, the determination result to the image shifter 16 and the like.

To the data selector 14, inputted are the image data to be supplied to the first image memory 11 and the image data outputted from the first image memory 11. The data selector 14 selects one from the above two supplied image data based on the determination result received from the sequence detector 13. That is, when the received data is determined to be the signals after telecine conversion by the sequence detector 13, the data selector 14 selects the image data to be supplied to the first image memory 11. On the other hand, when the received data to is determined to be TV signals by the sequence detector 13, the data selector 14 selects the image data outputted from the first image memory 11. Hereinafter, the image data selected by the data selector 14 is referred to as image data D2. The data selector 14 outputs the selected image data D2 to the motion vector detector 15.

Note that the data selector 14 is applicable to a connection mode in which one of the image data outputted from the first image memory 11 and the image data outputted from the second image memory 12 is selected.

The motion vector detector 15 detects the image data D1 and image data D2, and detects a motion vector based on, for example, the block matching method. In this block matching method, the screen is divided into blocks each consisting of predetermined pixels, and motion vectors are obtained by evaluating similarity in units of blocks. The image data D1 outputted from the second image memory 12 is a two-frame-delayed field with respect to a reference field. The image data D2 outputted from the data selector 14 is the reference field itself or the one-frame-delayed field with respect to the reference field.

That is, by detecting a motion vector between the image data D1 and image data D2, the motion vector detector 15 can detect a motion vector between the reference field and two-frame-delayed signals. In a similar fashion, it can detect a motion vector between the one-frame-delayed signals and two-frame-delayed signals. In other words, the motion vector detector 15 can control a field interval at which a motion vector is detected, based on the determination result received from the sequence detector 13.

The image shifter 16 receives the distance information including the comparison result of image signal levels from the sequence detector 13. The image shifter 16 also receives the motion vector detected by the motion vector detector 15. Further, the image shifter 16 is supplied with image data D1 from the second image memory 12, and the image data D2, from the data selector 14. The image shifter 16 shifts each pixel position of the supplied image signals in the vector direction of the received motion vector within the range of the received motion vector. The internal configuration of the image shifter 16 will later be described in detail.

In some cases, a double-speed field conversion circuit 3 which performs double-speed conversion on the field frequency of image signals may be integrated in the image signal processing apparatus 1. The double-speed field conversion circuit 3 is integrated to prevent screen flicker disturbance by improving the resolution. For example, a processing such as interpolation is performed in the PAL system, to convert image data having a field frequency of 50 Hz into image data having a double frequency which is 100 Hz.

The double-speed field conversion circuit 3 has an input terminal 31 connected to the television receiver, a double-speed converter 32, and a frame memory 33, as shown in FIG. 5.

The double-speed converter 32 writes image data after the telecine conversion, which are inputted through the input terminal 31 from the television receiver, or the TV signals into the frame memory 33. The double-speed converter 32 reads the image data written into the frame memory 33, at a speed which is twice the writing speed. As a result, for example, the frequency of the image signals of 50 fields/second according to the PAL system is converted to a double frequency, so that image data of 100 fields/second can be generated. The double-speed converter 32 supplies the image signal processing apparatus 1 with the image data subjected to the double-speed conversion.

Figure 6:
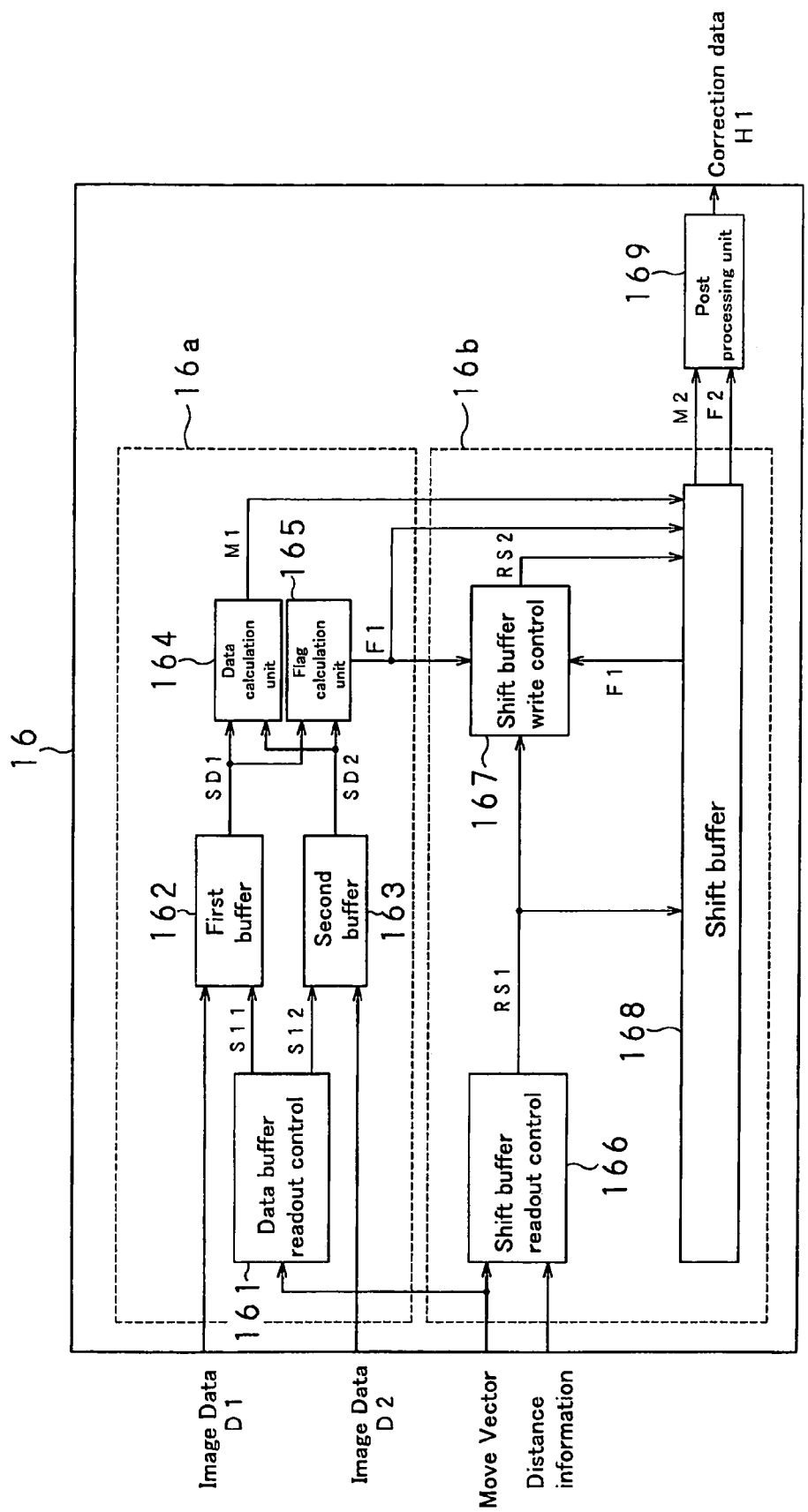
FIG. 6 is a block circuit diagram showing an image shifter forming part of the image signal processing apparatus.

Next, the internal configuration of the image shifter 16 will be described in detail with reference to FIG. 6. The image shifter 16 is composed of a data processing unit 16a and a data shift unit 16b.

The data processing unit 16a comprises a data buffer readout control unit 161, a first buffer 162, a second buffer 163, a data calculation unit 164, and a flag calculation unit 165.

To the data buffer readout control unit 161, a motion vector detected in the motion vector detector 15 is inputted. The data buffer readout control unit 161 calculates buffer control signals S11 and S12 based on the inputted motion vector. Each of the buffer control signals S11 and S12 is formed of address signal for sequential readout of data, and enable signal. For example, in the case where each of the first and second buffers 162 and 163 is realized by a frame memory and the like, the data buffer readout control unit 161 calculates each of address signals of X- and Y-coordinates, respectively, as absolute coordinate values. On the other hand, in case where each of the first and second buffers 162 and 163 is formed of the minimum necessary memory such as a line memory, the data buffer readout control unit 161 calculates each of address signals of X- and Y-coordinates as relative coordinate values.

Assuming that X- and Y-coordinates of values of an address of the buffer control signal S11 are (AX1, AY1) and that X- and Y-coordinates of values of a supplied motion vector are (VX, VY), the address of the buffer control signal S12 (AX2, AY2) is represented by the following equations.

$$AX2=AX1+VX \quad (1.1)$$

$$AY2=AY1+VX \quad (1.2)$$

The data buffer readout control unit 161 supplies the first buffer 162 with the buffer control signal S11 containing these calculated address signals. The data buffer readout control unit 161 supplies the second buffer 163 with the buffer control signal S12 containing address signals calculated in the same way.

The first buffer 162 sequentially stores the image data D1 transmitted from the second image memory 12. The first buffer 162 reads out the stored image data D1 according to the supplied buffer control signal S11. More specifically, when the enable of the supplied buffer control signal S11 is valid, the first buffer 162 reads out the image data D1 stored in the first buffer 162 according to address values contained in the buffer control signal S11. The image data D1 thus read out is hereinafter referred to as a shift data SD1. The first buffer 162 transmits the shift data SD1 to the data calculation unit 164 and the flag calculation unit 165.

The first buffer 162 may be a frame memory which stores data corresponding to one frame, or formed of the minimum necessary memory such as a line memory which complies with the region that motion vector values fall in. Further, the first buffer may be realized by a FIFO memory and the like in order to sequentially read out data.

The second buffer 163 sequentially stores the image data D2 transmitted from the data selector 14. The second buffer 163 reads out the stored image data D2 according to the supplied buffer control signal S12. More specifically, when the enable of the supplied buffer control signal S12 is valid, the second buffer 163 reads out the image data D2 stored in the second buffer 163 according to address values contained in the buffer control signal S12. The image data D2 thus read out is hereinafter referred to as a shift data SD2. The second buffer 163 transmits the shift data SD2 to the data calculation unit 164 and the flag calculation unit 165.

The second buffer 163 may be a frame memory which stores data corresponding to one frame, or formed of the minimum necessary memory such as a line memory which complies with the region that motion vector values fall in. In the latter case, a system in which data is randomly read out according to the randomly supplied address values is established.

The data calculation unit 164 calculates move data M1 based on the supplied shift data SD1 and shift data SD2. The data calculation unit 164 sequentially supplies the data shift unit 16b with the calculated move data M1.

Note that the move data M1 may be calculated by outputting the shift data SD1 or shift data SD2 without change, or may be calculated as an average value between the shift data SD1 and shift data SD2. Further, the move data M1 may be calculated by weighted-averaging the shift data SD1 and shift data SD2 using values such as a motion vector.

The flag calculation unit 165 is supplied with the shift data SD1 and shift data SD2 and calculates a flag F1 containing error information of the detected motion vector. In some cases, the flag F1 is represented by a magnitude of the absolute difference value between the shift data SD1 and shift data SD2. In other cases, it is calculated based on a motion vector error. Further, it may be calculated by outputting the flag information pertaining to the motion vector without change. The flag calculation unit 165 supplies the data shift unit 16b with the calculated flag F1.

The data shift unit 16b comprises a shift buffer readout control unit 166, a shift buffer write control unit 167, and a shift buffer 168.

The shift buffer readout control unit 166 receives a motion vector from the motion vector detector 15, and distance information containing the determination result with respect to each signal from the sequence detector 13. The shift buffer readout control unit 166 generates a shift buffer readout control signal RS1 based on the motion vector, distance information and a built-in address counter. The shift buffer readout control signal RS1 is formed of an address signal for sequential readout of data, and an enable signal. For example, in the case where the shift buffer 168 is realized by a frame memory and the like, the shift buffer readout control unit 166 calculates address signals of X- and Y-coordinates, respectively, as absolute coordinate values. On the other hand, in the case where the shift buffer 168 is formed of the minimum necessary memory such as a line memory, the shift buffer readout control unit 166 calculates address signals of X- and Y-coordinates, respectively, as relative coordinate values.

Assuming that X- and Y-coordinates of values of an address denoted by the address counter are (CX1, CY1) and that X- and Y-coordinates of values of a supplied motion vector are (VX, VY), the address of the shift buffer readout control signal RS1 (SX, SY) is represented by the following equations.

$$SX=CX1+(VX \times \alpha) \quad (2.1)$$

$$SY=CY1+(VY \times \alpha) \quad (2.2)$$

where α is distance information and represented by the number which is equal to or greater than 0 and is equal to or smaller than 1. The value of α is set to minimum in the first field, and is sequentially increased every time the field shifts to the next field. The value of α can be increased linearly by ¼ in the case where the signals after telecine conversion are inputted. In this case, α shifts from 0 to ¼, 2/4, and ¾ as the field shifts from the first field to the second field, the third field, and the fourth field. Further, in the case where the TV signals are inputted, the value of a can be increased linearly by ½ such that a shifts from 0 to ½ as the field shifts from the first field.

The shift buffer readout control unit 166 supplies the shift buffer write control unit 167 and shift buffer 168 with the generated shift buffer readout control signal RS1.

The shift buffer write control unit 167 is supplied with the flag F1, a flag F' and the shift buffer readout control signal RS1 from the flag calculation unit 165, the shift buffer 168, and the shift buffer readout control unit 166, respectively. The shift buffer 167 determines the priority of the data to be written according to whether the flag F is larger or smaller than the flag F'. The shift buffer write control unit 167 calculates a write address based on the supplied shift buffer readout control signal RS1, and supplies the shift buffer 168 with the write address and the priority determined as described above, as a shift buffer write control signal RS2.

The shift buffer 168 is constituted by a data buffer and a flag buffer. The data buffer is a buffer for storing and providing data. The flag buffer is a buffer for storing and providing a flag. In the data buffer and flag buffer, writing and reading operations are performed based on the same control signals. Each of the data buffer and flag buffer may be a frame memory which stores data corresponding to one frame, or formed of the minimum necessary memory such as a line memory which complies with the region that motion vector values fall in.

The shift buffer 168 firstly initializes the flag buffer. The flag to be written into the flag buffer includes mark information indicating whether data has been written or not. The mark information uses two marks of "NM" and "OK". "NM" indicates that data has not been written at the time of initialization. Contrary, "OK" means that data has already been written.

When the enable of the shift buffer readout control signal RS1 is valid, the shift buffer 168 transmits the flag F', with the flag F' related to the address, to the shift buffer write control unit 167. When the enable of the shift buffer write control signal RS2 is valid, the shift buffer 168 writes the move data M1 and flag F1 into the data buffer and flag buffer, respectively, according to the address value of the shift buffer write control signal RS2. After organizing the stored pixel values in serial order to create move data M2, and sequentially reading out a shift flag F2, the shift buffer 168 transmits the move data M2 and shift flag F2 to a post processing unit 169.

The post processing unit 169 reprocesses the move data M2 based on the shift flag F2 inputted from the shift buffer 168, and outputs it as a correction data H1 to a CRT 2.

Next, operations of the image signal processing apparatus 1 according to the present invention will be described.

Figure 7:
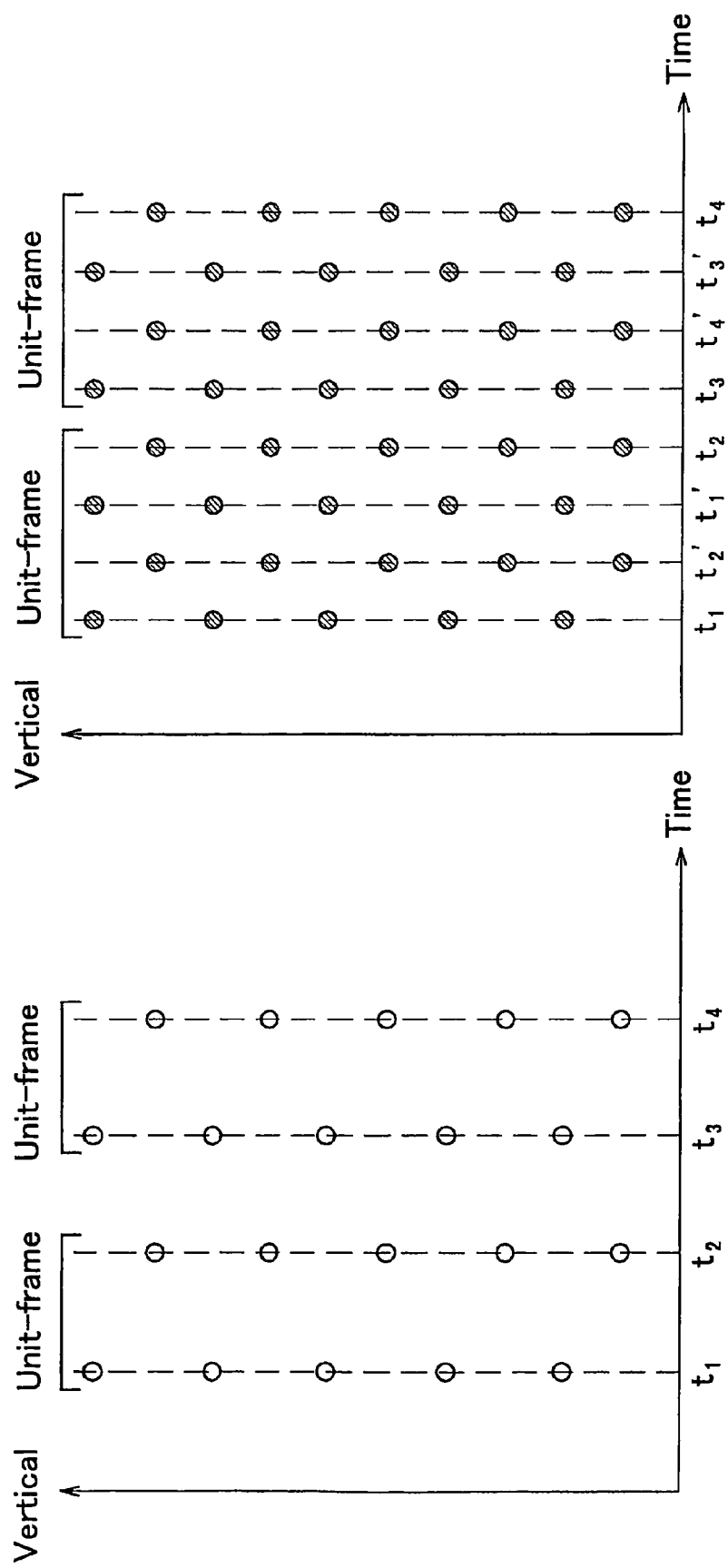
FIGS. 7A and 7B show a relationship between each of fields before and after double-speed conversion in a double-speed field conversion circuit and pixel positions.

FIGS. 7A and 7B show a relationship between each of fields before and after double-speed conversion in a double-speed field conversion circuit and pixel positions. In the figures, the abscissa axis represents time and the ordinate axis represents the position of each pixel in the vertical direction.

The image data before the double-speed conversion are interlace image of 50 fields/second according to the PAL system, and every unit-frame is formed of two fields, as shown in FIG. 7A.

On the other hand, the image data after the double-speed conversion are interlace image of 100 fields/second. Therefore, as shown in FIG. 7B, new two fields t2' and t1' are generated between fields t1 and t2. No fields are generated between fields t2 and t3 but new two fields t4' and t3' are generated between fields t3 and t4. Therefore, in the image data, every unit-frame is formed of four fields.

In some cases, those newly generated fields t1', t2', . . . are obtained by using a median filter or the like, supposing that each pixel value is an intermediate value among three pixels surrounding each pixel. The newly generated fields t1', t2', . . . have the same contents as the fields t1, t2, . . . , respectively. As a result of this, every unit-frame is formed of four fields, so that the resolution can be improved by increasing the number of screens per unit time. Accordingly, the screen flicker disturbance can be suppressed.

Figure 8:
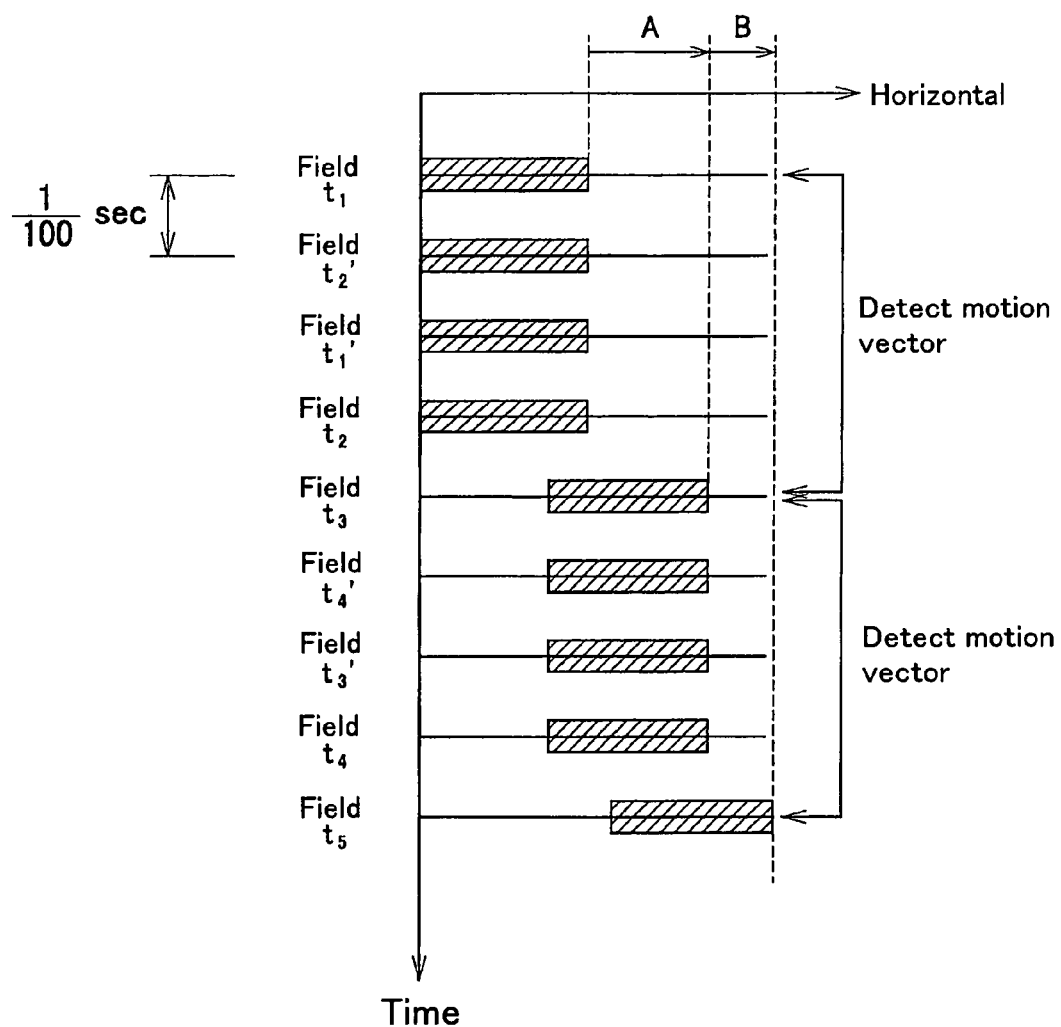
FIG. 8 shows a relationship between each field and an image position in case where an image moves in the horizontal direction in a telecine-converted image.

FIG. 8 shows a relationship between each field and an image position with respect to image data subjected to the double-speed conversion after telecine conversion in the case where an image moves in the horizontal direction. In FIG. 8, the abscissa axis represents the image position in the horizontal direction, and the ordinate axis represents time. Images already subjected to the telecine conversion are, as shown in FIG. 8, supplied to the first image memory 11 at a constant time cycle, in the order of fields t1, t2', t1' and t2, and the images are all displayed on one equal position. As the field shifts to t3, the image shifts in the horizontal direction (to the right side), and the images are supplied to the first image memory 11 in the order of fields t3, t4', t3' and t4.

When, for example, the field t3 is supplied to the first image memory 11 (hereinafter referred to as a reference field), the field t1 which precedes by two frames the reference field is outputted from the second image memory 12 (hereinafter referred to as a two-frame-delayed field).

Figure 9:
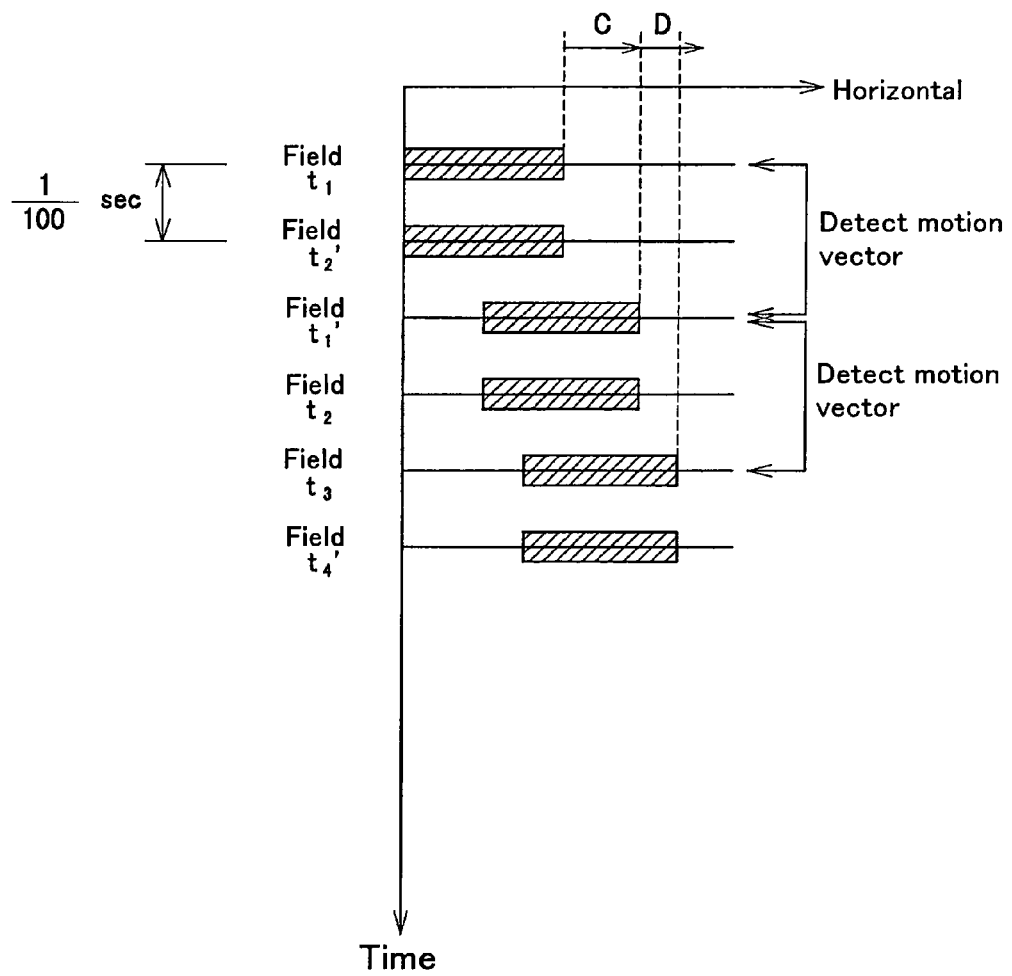
FIG. 9 shows a relationship between each field and an image position in case where an image moves in the horizontal direction in an image formed of TV signals.

FIG. 9 shows a relationship between each field and an image position with respect to image data obtained by double converting the TV signals in the case where an image moves in the horizontal direction. In the fields t1 and t2' which form one single unit-frame, an equal image is displayed at an equal position. Similarly, in the fields t1' and t2 which form one single unit-frame, an equal image is displayed at an equal position.

The motion vector detector 15 detects a motion vector between the reference field and the two-frame-delayed field in units of pixels or blocks with respect to the signals subjected to the double-speed conversion after telecine conversion shown in FIG. 8. In the case of the example shown in FIG. 8, the vector direction of the motion vector is the horizontal direction (to the right side) with the two-frame-delayed field taken as a reference, and has a vector quantity of A. Similarly, when the reference field is the field t5, the two-frame-delayed field is t3 and the vector quantity of the motion vector is B. By repeating this procedure, the directions and quantities of vectors can be sequentially obtained taking each two-frame-delayed field as a reference. The motion vector detector 15 sequentially transmits the obtained vector directions and quantities of the motion vector to the image shifter 16.

The motion vector detector detects a motion vector between the reference field and the one-frame-delayed field in units of pixels or blocks with respect to the signals obtained by double-converting the TV signals shown in FIG.

9. In the case of the example shown in FIG. 9, the vector direction of the motion vector is the horizontal direction (to the right side) with the one-frame-delayed field taken as a reference, and has a vector quantity of C when the reference field is the field t1'. Similarly, when the reference field is the field t4', the one-frame-delayed field is t1' and the vector quantity of the motion vector is D. By repeating this procedure, the directions and quantities of motion vectors can be sequentially obtained taking each one-frame-delayed field as a reference. The motion vector detector 74 sequentially transmits the obtained vector directions and quantities of the motion vector to the image shifter 16.

The sequence detector 13 sequentially detects the reference fields and those fields each of which precedes by one frame the reference field outputted from the first image memory 11 (hereinafter referred to as one-frame-delayed field), and calculates difference values in pixel signal levels at an equal pixel position.

Figure 10:
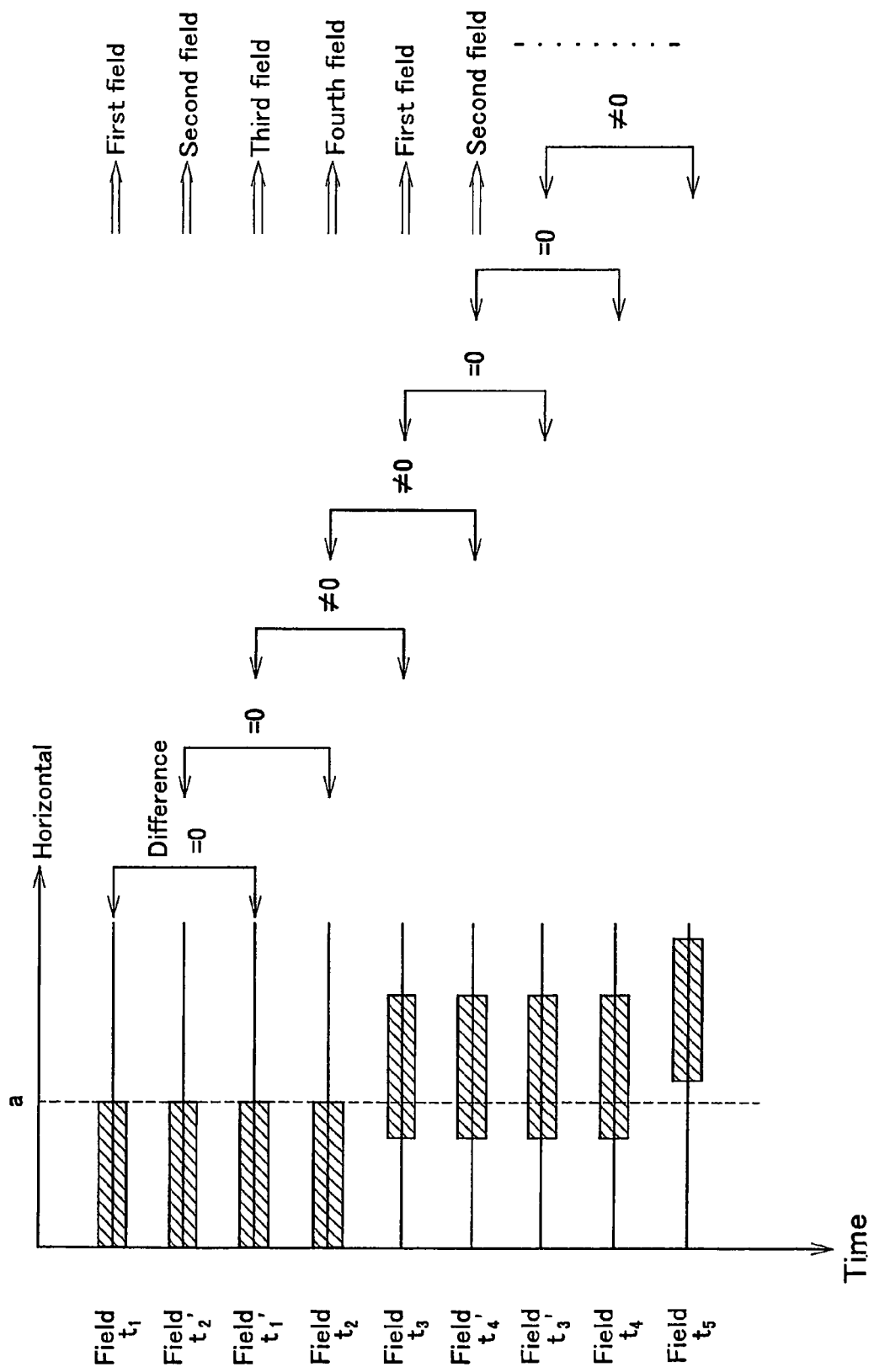
FIG. 10 is a view for explaining a method of detecting a sequence.

More specifically, in the case of the telecine-converted images, the reference field t1' and the one-frame-delayed field t1 form one single unit-frame, so that the difference value in pixel signal levels, for example, at a pixel position a is 0, as shown in FIG. 10. Next, the field t2 is supplied as the reference field, and then, the field t2' becomes the one-frame-delayed field. Therefore, the difference value in pixel signal levels at a pixel position a is 0, too.

Next, the field t3 is supplied as the reference field, and then, the one-frame-delayed field is t1'. Since both of these field respectively form parts of different unit-frames, the difference value in pixel signal levels at the point a is not 0 (but will be 1 hereinafter). Next, t4' is supplied as the reference field, and then, the field t2 becomes the one-frame-delayed field, so that the difference value in pixel signal levels at the point a is 1, too.

Further, t3' is supplied as the reference field, and then, the one-frame-delayed field is t3. Since both of these fields form one equal unit-frame, the difference value in pixel signal levels at the point a is 0 again. This tendency applies to reference fields supplied thereafter. The calculated difference values of "0011" repeat in this order at a cycle of four fields. Hence, it is possible to specify relationships of each field to preceding and following fields, by detecting the sequence for every unit of four fields.

Where this tendency is observed with respect to the one-frame-delayed fields, the difference values are "0011" in the order from the first field of every unit-frame. Therefore, when the difference value "0" is calculated at first, the one-frame-delayed field detected at this time is specified as the first field of a unit-frame (hereinafter referred to as the first field). When the difference value "0" continues, the one-frame-delayed field detected at this time is specified as the second field. When 1 is calculated at first to be the difference value, the one-frame-delayed field detected at this time is specified as the third field. When the difference value "1" continues, the one-frame-delayed field detected at this time is specified as the fourth field.

In the case where the TV signals are inputted, it is also necessary to determine whether each field corresponds to the first field or the second field. However, since the double-speed field conversion circuit 3 identifies the corresponding field at the time of double-conversion, there is no need to perform the sequence detection as described above. That is, at the time when the image signals are inputted from the double-speed field conversion circuit 3, each of the first and second fields has already been specified.

Figure 11A:
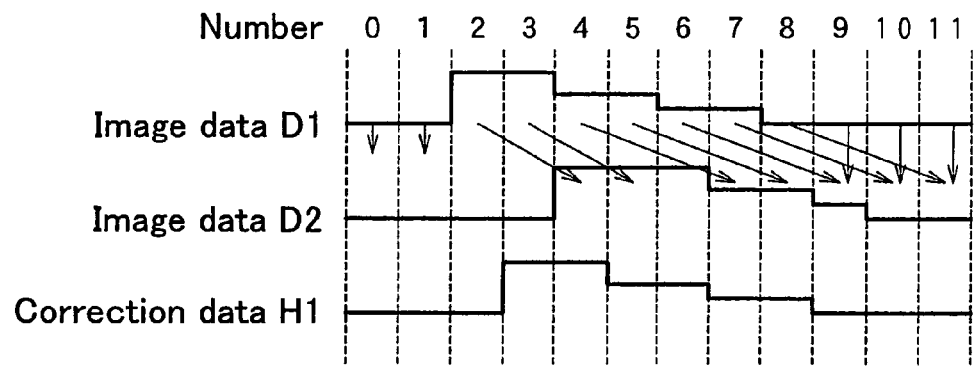
FIGS. 11A and 11B depict one-dimensionally an operation process of the image shifter.

FIG. 11A shows, as a one-dimensional graph, an example of the operation of the image shifter 16 in the case where the TV signals in which one unit-frame is formed of two fields are inputted. In the operation example of FIG. 11A, in which the TV signals are inputted, the image data D1 is the first field, and the image data D2 is the first field one frame after the image data D1. In FIG. 11A, the number starting from 0 is an address that indicates the pixel position, and the ordinate axis represents the pixel value (=pixel signal level).

Figure 11B:
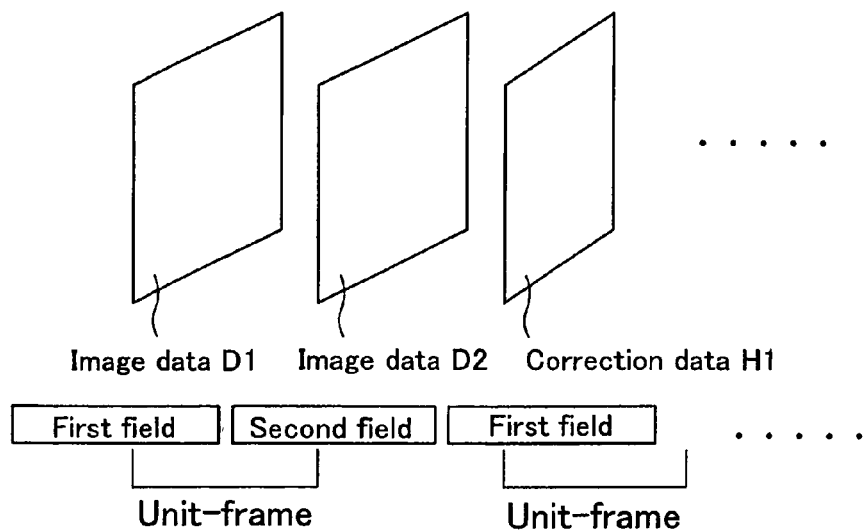

In the present invention, as shown in FIG. 11B, correction data is written into the second field (hereinafter referred to as a write field) interposed between the image data D1 and the image data D2 which are, in terms of time, different from each other so that smooth motions are obtained. That is, in the example shown in FIG. 11A, the image that makes the entire motion look smoothly is generated in the above write field at the time when the image data D1 having a convex portion on the left side thereof shifts to the image data D2 having a smooth convex portion in the middle thereof.

FIGS. 12A to 12D show a concrete operation example of the image shifter 16 shown in FIG. 11A using pixel values. FIG. 12A shows the image data D1 and the image data D2 which are to be inputted to the image shifter 16. The number is an address that indicates the pixel position. Since each pixel has a luminance, the pixel value is assigned for each number in the supplied image data D1.

That is, in the operation example shown in FIG. 12A, the image data D1 is represented by the pixel values of 100, 100, 200, . . . which, in that order, correspond to the addresses indicated by the numbers 0 to 11.

The image data D2 positioned after the image data D1 is represented by the pixel values of 100, 100, 100, . . . which, in that order, correspond to the addresses indicated by the numbers 0 to 11.

The motion vector shown in FIG. 12A represents a vector quantity between the image data D1 and the image data D2 with the pixel-based image data D1 as a reference. For example, the pixel having a pixel value of 100 at the address number 1 of the image data D1 is also at the address number 1 of the image data D2 which is positioned one field behind. Hence a motion vector of 0 is obtained. For example, the pixel having a pixel value of 200 corresponding to address number 2 in the image data D1 shifts to address number 4 in the image data D2. Hence the motion vector is calculated as: 4−2=2. Note that arrows shown in FIG. 11A represent pixel-based motion vectors.

Each of the first buffer 162 and second buffer 163 relates each pixel value in the image data D1 and image data D2 to address numbers, and stores it therein. For example, in the first buffer with which the image data D1 has been supplied, address numbers shown in FIG. 12A and the corresponding pixel values are stored.

FIG. 12B shows processing of the data buffer readout control unit 161. The data buffer readout control unit 161 generates a buffer control signal S12 based on the above described equations (1.1) and (1.2). When the buffer control signal S11 is assumed to be the number that corresponds to the address, the motion vector in the address number 1 is 0, as shown in FIG. 12A. Hence the number of the buffer control signal S12 is 1, too. In the case of address number 2, in the buffer control signal S11, a motion vector of 2 is obtained. Hence the number of the buffer control signal S12 is 4.

The buffer control signal S11 is supplied to the first buffer 162, from which the pixel value at the number corresponding to the address in the buffer control signal S111 is read out. The read out pixel value is related, as shift data SD1, to the address, and supplied to the data calculation unit 164 and the like.

Similarly, the buffer control signal S12 is supplied to the second buffer 163, from which the pixel value at the number corresponding to the address in the buffer control signal S12 is read out. The read out pixel value is related, as shift data SD2, to the address, and supplied to the data calculation unit 164 and the like.

The bottom table of FIG. 12B shows the case where the move data M1 is calculated as an average value between the shift data SD1 and shift data SD2. The move data M1 is a prototype of the pixel value to be written into the field interposed between the image data D1 and image data D2. The flag F1 is also shown in the table, which is calculated as a difference absolute value between the shift data SD1 and shift data SD2. In the case where the difference absolute value is not 0, the pixel signal level is considered to change between the image data D1 and image data D2 in the pixel corresponding to the relevant address. That is, in the pixel corresponding to the relevant address, an error in the pixel signal levels has occurred by the time the image data D1 shifts to the image data D2.

FIG. 12C shows the shift buffer readout control signal RS1. In the example shown in FIG. 12C, the value starting from 0, which is obtained from the address counter (not shown) is shifted, in increments of 1, to 1, 2 . . . in the plus direction. The obtained value is set as CX1, and the distance information a is set to ½ in the equations (2.1) and (2.2). Note that the value denoted by the address counter is outputted with the value related to the address number in the image data D1.

In generating the shift buffer control signal RS1, when, for example, the number of the address counter is 2, the motion vector of the pixel position corresponding to the number 2 is 2, based on FIG. 12A. Hence, the address number of the shift buffer readout control signal RS1 is calculated, based on the equation (2.1), as: 2+2×½=3, with the result that 3 is obtained as the number of the shift buffer readout control signal RS1. Similarly, when the number of the address counter is 3, the motion vector of the pixel position corresponding to the number 3 is 2, based on FIG. 12A. Hence, the address number of the shift buffer readout control signal RS1 is calculated, with the motion vector of 2 assigned to the variable in the equation (2.1), as: 3+2×½=4, with the result that 4 is obtained as the number of the shift buffer readout control signal RS1.

That is, the number of the generated shift buffer readout control signal RS1 represents the address number into which the correction data is written, in the write field. Thus, the flag F' stored in the shift buffer 168 is read out in order to detect a write status of the address number of the shift buffer control signal RS1 to the shift buffer 168. The flag F' is returned as "NM" in the case where data has not been written into the accessed address in the shift buffer 168. Contrary, the flag F' is returned as a value of the difference absolute value to the address into which the data has been written.

In the example in FIG. 12C, for example, the mark representing that data has not been written is shown for the address corresponding to the number from 0 to 8 of the shift buffer readout control signal RS1, the mark being returned from the shift buffer 168 through the flag F'. On the other hand, to the address corresponding to the number 9, "NM", which means that the data has not been written, is initially returned and the difference absolute value is next returned as the flag F'. This means that a plurality of pixel values are written into the address number of the shift buffer 168, as shown in FIG. 11A in which vector motions from the number 6 and number 9 in the image data 1 concentrate on the address number 9 in the image data 2.

The move data M1 is sequentially written into the corresponding address number in the shift buffer 168 in which the flag F' is returned as "NM". In the case where the flag F' has any numerical value, the flag F' and flag F corresponding to the relevant address number are compared. In this case, the smaller one is made effective. As a result, the pixel value obtained based on the motion vector having less errors can be written while the image data D1 shifts to the image data D2, thereby accurately compensating motions of the images with respect to images of wide variations such as the images in which a plurality of motion vectors are directed to one single pixel position.

The shift buffer write control unit 162 determines the address into which the move data M1 is to be written based on the supplied flag F'. The shift buffer write control signal RS2 shown in FIG. 12C represents the number corresponding to the determined address. The move data M1 corresponding to the shift buffer write control signal RS2 is written into the shift buffer 168. In the case of number 9, for example, the flag F is 10, and flag F' is 0. Since the F', which is smaller than the flag F, is prioritized, the pixel value "100" based on the address number 6, which has initially been written continues to be stored in the shift buffer 168.

FIG. 12C shows the result, in which the move data M2 stored in the shift buffer 168 is re-arranged in the order of the address number. The shift flag F2 denotes mark information. The output of "OK" in the shift flag F2 means that the data has been written into the corresponding address number. Contrary, the output of "NM" means that the data has not been written into the corresponding address number. Incidentally, since data has not been written into the address number 2, the mark "NM" is outputted as a shift flag.

FIG. 12D shows correction data H1 obtained by subjecting the move data M2 supplied from the shift buffer 168 to post processing. The number 2, into which data has not been written, is subjected to the post processing, so that data is newly written into the number 2. In the post processing, there might be a method of writing the data of the address number 1 on the left side of the number 2 without change, calculating the average value of the data surrounding the number 2 or the like.

When the correction data H1 shown in FIG. 12D is written into the second field interposed between the image data D1 and the image data D2, entire motion of the image becomes smooth as shown in FIG. 11A.

That is, the image signal processing apparatus 1 according to the present invention writes an optimum correction data capable of smoothing motions into the field interposed between one image data and the other image data which are different, in terms of time, from each other, so that discontinuity in motions of images can efficiently be eliminated even when the pixel value changes as the image moves, for example, in the horizontal direction.

Further, the image signal processing apparatus 1 can efficiently eliminate discontinuity in motions with respect to images of wide variations, in the cases where both of the image signals after telecine conversion and TV signals are inputted. As a result, the image signal processing apparatus 1 can be built in a television receiver to which film signals and TV signals are both inputted. Further, upgrading can be easily made by newly incorporating the image signal processing apparatus 1 into the television receiver already sold, leading to an increased versatility.

Figure 13:
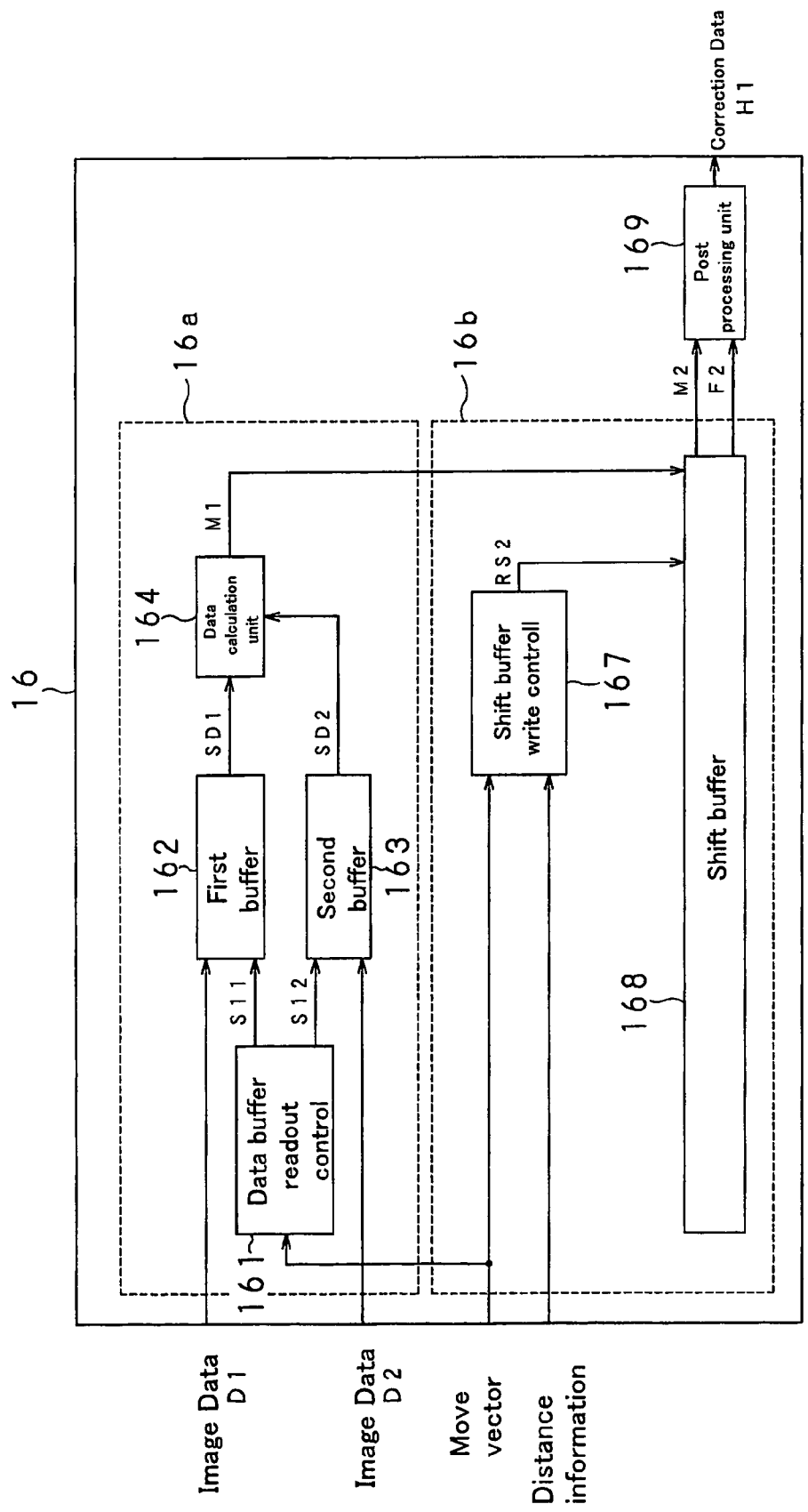
FIG. 13 is a block diagram of the image shifter in which the priority at the time of writing data is not determined.

The present invention is not limited to the above embodiment. For example, as shown in FIG. 13, the present invention can be applied to the image signal processing apparatus in which the flag calculation unit 165 and shift buffer readout control section 166 are removed from the image shifter 26. In the image shifter 26, the shift buffer readout control signal RS1, flag F, and flag F' are omitted and the priority of the data to be written is not determined. When an overlap of the data to be written into the address occurs in the image shifter, the data that has already been written is overwritten by more recently calculated data. Therefore, the control at the time of reading out the flag becomes unnecessary, so that the circuit can be simplified.

The present invention is not limited to the case of application to a television receiver according to the PAL system. For example, the present invention is applicable to a television receiver inputted with interlace image signals of 60 fields/second (30 unit-frames/second) according to NTSC (National TV System Committee). Alternatively, the present invention is applicable to a television receiver according to SECAM system.

Further, the present invention is not limited to the image signal processing apparatus built in television receivers but may be built in signal converters connected to television receivers.

Further, the present invention is applicable to the case where the image signals as transferred through the Internet are displayed on the PC, and the case where media and image format are transformed.

Still further, the present invention is realized by hardware such as a circuit, but the present invention can obviously be realized as software on the processor.

The present invention is not limited to the foregoing embodiment that has been described above with reference to the drawings. Various modifications, substitutions, or equivalents will readily occur to persons in the art without deviating from the appended claims and the scope of subject matters thereof.

INDUSTRIAL APPLICABILITY

As has been described above in detail, in the image signal processing apparatus and the method thereof according to the present invention, signals consist of unit-frames each formed of fields with a first field in the lead and which have been subjected to double-speed conversion are inputted, the first field is specified on the basis of calculated difference values in pixel signal levels, interpolation pixel data is calculated for each detected pixel, and the interpolation pixel data is written into the pixel positions obtained by shifting the positions of the detected pixels in a direction along the motion vector such that shift amount is gradually increased as the field shifts from the specified first field to the following fields.

As a result of this, the image signal processing apparatus and the method thereof according to the present invention can synergistically increase image quality by smoothening motions of images while suppressing screen flicker disturbance with respect to images of wide variations.

The invention claimed is:

1. An image signal processing apparatus comprising:
sequence detection means for calculating a difference value in pixel signal level between a detected pixel in a current field and a detected pixel at the same position in a field which comes one frame behind the current field, with respect to the inputted image signal consist of unit-frames each formed of fields with a first field in the lead and which has been subjected to double-speed conversion, and specifies the first field based on the difference value;

motion vector detection means for detecting a motion vector for a field which comes one frame or two frames behind the current field, with respect to the detected pixel in the current field;

data calculation means for calculating interpolation pixel data for the detected pixel based on the pixel data of the detected pixel in the current field and the pixel data of each pixel in the field which comes one frame or two frames behind the current field; and image control means for writing the interpolation pixel data into the pixel position obtained by shifting the position of the detected pixel in the current field in a direction along the motion vector, in a field subsequent to the first field, the image control means for sequentially increasing the amount with which the position of the detected pixel is shifted every time the field shifts from the first field to the following fields within a range of a vector quantity of the detected motion vector.

2. The image signal processing apparatus according to claim 1, wherein the data calculation means sets, as the interpolation pixel data,
one of the pixel data of the detected pixel in the current field and the pixel data obtained by shifting the pixel position in the field which comes one frame or two frames behind the current field in the motion vector direction by the motion vector quantity,
an average value between the two, or
a weighted-average value between the two in accordance with the vector quantity of the motion vector.

3. The image signal processing apparatus according to claim 1, comprising flag calculation means for calculating a flag containing error information of the detected motion vector, wherein
the image control means determines the priority at the time of writing the interpolation pixel data based on the calculated flag.

4. The image signal processing apparatus according to claim 3, wherein the flag calculation means calculates, as the flag, a difference absolute value between the pixel data of the detected pixel in the current field, and the pixel data obtained by shifting the pixel position in the field which comes one frame or two frames behind the current field in the motion vector direction by the motion vector quantity.

5. The image signal processing apparatus according to claim 1, wherein interpolation pixel data for the pixel into which the interpolation pixel data has not been written is determined based on interpolation pixel data written into the pixel positions surrounding the relevant pixel, in a field subsequent to the first field.

6. The image signal processing apparatus according to claim 1, wherein the image control means changes the shift amount in accordance with the number of fields each forming the unit-frame.

7. The image signal processing apparatus according to claim 1, wherein image signals generated by performing double-speed conversion on an image subjected to telecine conversion and which is formed of unit-frames each including four fields, or image signals generated by double-speed converting television signals and which is formed of unit-frames each including two fields are inputted, wherein
the motion vector detection means detects a motion vector for the field which comes two frames behind the current field when the difference values include at least 0, and detects a motion vector for the field which comes one frame behind the current field when both of the difference values is not 0.

8. The image signal processing apparatus according to claim 1, wherein, when the difference value sequentially becomes 0 in the case where the difference values include at least 0, the sequence detection means specifies the current field inputted earlier, as the first field.

9. The image signal processing apparatus according to claim 1, wherein the image control means increases the shift amount in increments of the amount obtained by dividing the vector quantity of the detected motion vector by the number of fields each forming unit-frames every time the field shifts from the first field to the following fields.

10. The image signal processing apparatus according to claim 1, wherein the motion vector detection means detects the motion vector for each block formed of a predetermined number of pixels based on a block matching method.

11. The image signal processing apparatus according to claim 1, wherein the inputted image signals are interlace image signals according to PAL system.

12. An image signal processing method, comprising the steps of:
inputting an image signal consist of unit-frames each formed of fields with a first field in the lead and which has been subjected to double-speed conversion;
calculating, with respect to the inputted image signal, a difference value in pixel signal level between a detected pixel in a current field and a detected pixel at the same position in a field which comes one frame behind the current field to specify a first field based on the difference value;
detecting a motion vector for a field which comes one frame or two frames behind the current field, with respect to the detected pixel in the current field;
calculating interpolation pixel data for the detected pixel based on the pixel data of the detected pixel in the current field and the pixel data of each pixel in the field which comes one frame or two frames behind the current field;
writing the interpolation pixel data into the pixel position obtained by shifting the position of the detected pixel in the current field in a direction along the motion vector, in a field subsequent to the first field; and
sequentially increasing the amount with which the position of the detected pixel is shifted every time the field shifts from the first field to the following fields within a range of a vector quantity of the detected motion vector.

13. The image signal processing method according to claim 12, wherein
one of the pixel data of the detected pixel in the current field and the pixel data obtained by shifting the pixel position in the field which comes one frame or two frames behind the current field in the motion vector direction by the motion vector quantity,
an average value between the two, or
a weighted-average value between the two in accordance with the vector quantity of the motion vector, is set as the interpolation pixel data.

14. The image signal processing method according to claim 12, characterized by calculating a flag containing error information of the detected motion vector, and determining the priority at the time of writing the interpolation pixel data based on the calculated flag.

15. The image signal processing method according to claim 14, characterized by calculating, as the flag, a difference absolute value between the pixel data of the detected pixel in the current field, and the pixel data obtained by shifting the pixel position in the field which comes one frame or two frames behind the current field in the motion vector direction by the motion vector quantity.

16. The image signal processing method according to claim 12, characterized by determining interpolation pixel data for the pixel into which the interpolation pixel data has not been written based on interpolation pixel data written into the pixel positions surrounding the relevant pixel, in a field subsequent to the first field.

17. The image signal processing method according to claim 12, characterized by changing the shift amount in accordance with the number of fields each forming the unit-frame.

18. The image signal processing method according to claim 12, comprising the steps of:
inputting image signals generated by performing double-speed conversion on an image subjected to telecine conversion and which is formed of unit-frames each including four fields, or image signals generated by double-speed converting television signals and which is formed of unit-frames each including two fields;
detecting a motion vector for the field which comes two frames behind the current field when the calculated difference values include at least 0; and
detecting a motion vector for the field which comes one frame behind the current field when both of the calculated difference values is not 0.

19. The image signal processing method according to claim 12, characterized by specifying the current field inputted earlier, as the first field when the calculated difference value sequentially becomes 0 in the case where the calculated difference values include at least 0.

20. The image signal processing method according to claim 12, characterized by increasing the shift amount in increments of the amount obtained by dividing the vector quantity of the detected motion vector by the number of fields each forming unit-frames every time the field shifts from the first field to the following fields.

21. The image signal processing method according to claim 12, characterized by detecting the motion vector for each block formed of a predetermined number of pixels based on a block matching method.

22. The image signal processing method according to claim 12, wherein the inputted image signals are interlace image signals according to PAL system.

* * * * *